US012621835B2

(12) United States Patent
Lee et al.

(10) Patent No.: US 12,621,835 B2
(45) Date of Patent: May 5, 2026

(54) METHOD AND ELECTRONIC DEVICE FOR TRANSMITTING PRECODED PUCCH SIGNAL IN WIRELESS COMMUNICATION SYSTEM

(71) Applicant: SAMSUNG ELECTRONICS CO., LTD., Suwon-si (KR)

(72) Inventors: Byongok Lee, Suwon-si (KR); Joohyun Do, Suwon-si (KR); Heejin Seo, Suwon-si (KR); Hyunseok Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 338 days.

(21) Appl. No.: 18/220,612

(22) Filed: Jul. 11, 2023

(65) Prior Publication Data

US 2024/0023104 A1     Jan. 18, 2024

(30) Foreign Application Priority Data

Jul. 12, 2022     (KR) ......................... 10-2022-0085878

(51) Int. Cl.
*H04W 72/21*          (2023.01)
*H04B 7/06*           (2006.01)

(52) U.S. Cl.
CPC .......... *H04W 72/21* (2023.01); *H04B 7/0626* (2013.01); *H04B 7/0639* (2013.01)

(58) Field of Classification Search
CPC .................................................... H04W 72/21
See application file for complete search history.

(56) References Cited

U.S. PATENT DOCUMENTS

| 8,724,607 | B2 * | 5/2014 | Han | H04B 7/0689 |
| | | | | 370/252 |
| 8,737,518 | B2 * | 5/2014 | Tosato | H04B 7/0434 |
| | | | | 375/267 |
| 9,148,209 | B2 | 9/2015 | Lin et al. | |
| 9,287,954 | B2 | 3/2016 | Ramkumar et al. | |
| 9,654,987 | B2 * | 5/2017 | Hwang | H04B 7/0665 |
| 9,723,594 | B2 | 8/2017 | Han et al. | |
| 9,923,696 | B2 | 3/2018 | Lee et al. | |

(Continued)

FOREIGN PATENT DOCUMENTS

| KR | 10-1882260 B1 | 7/2018 |
| KR | 10-2181251 B1 | 11/2020 |

(Continued)

OTHER PUBLICATIONS

Communication issued Dec. 23, 2024 by the European Patent Office in European Patent Application No. 23183810.3.

(Continued)

*Primary Examiner* — Guang W Li
(74) *Attorney, Agent, or Firm* — Sughrue Mion, PLLC

(57)          ABSTRACT

Provided is an operation method of an electronic device including a plurality of antennas, the operation method including obtaining precoding information from a base station, generating a physical uplink control channel (PUCCH) precoding vector based on the precoding information, generating a precoded PUCCH signal by multiplying a PUCCH signal by the PUCCH precoding vector, and transmitting the precoded PUCCH signal to the base station by using the plurality of antennas.

17 Claims, 13 Drawing Sheets

(56)          References Cited

U.S. PATENT DOCUMENTS

| | | | | |
|---|---|---|---|---|
| 10,779,310 | B2 | 9/2020 | Wang et al. | |
| 11,064,374 | B2 * | 7/2021 | Xu | H04W 24/02 |
| 11,109,364 | B2 | 8/2021 | Yi et al. | |
| 11,218,208 | B2 | 1/2022 | Huang et al. | |
| 11,984,958 | B2 * | 5/2024 | Huang | H04B 7/0639 |
| 2007/0254607 | A1 * | 11/2007 | Bandemer | H04L 25/03343 |
| | | | | 455/562.1 |
| 2008/0192849 | A1 * | 8/2008 | Kim | H04L 25/03343 |
| | | | | 375/260 |
| 2012/0113913 | A1 * | 5/2012 | Tiirola | H04L 1/18 |
| | | | | 370/329 |
| 2021/0399773 | A1 * | 12/2021 | Huang | H04B 17/364 |
| 2022/0116965 | A1 | 4/2022 | Park et al. | |
| 2022/0311489 | A1 * | 9/2022 | Rakib | H04B 7/0452 |

FOREIGN PATENT DOCUMENTS

| | | | |
|---|---|---|---|
| KR | 10-2196727 | B1 | 12/2020 |
| WO | 2008/125021 | A1 | 10/2008 |
| WO | 2021/150349 | A1 | 7/2021 |

OTHER PUBLICATIONS

ETSI, "Technical Specification—5G; NR; Physical channels and modulation", 3GPP TS 38.211, version 15.2.0, Release 15, Jul. 2018. (98 pages total).

ETSI, "Technical Specification—LTE; Evolved Universal Terrestrial Radio Access (E-UTRA) and Evolved Universal Terrestrial Radio Access Network (E-UTRAN); Overall description; Stage 2", 3GPP TS 36.300, version 13.5.0, Release 13, Dec. 2016. (328 pages total).

3GPP TS 38.211 V15.2.0 (Jun. 2018), 3rd Generation Partnership Project; Technical Specification Group Radio Access Network; NR; Physical channels and modulation (Release 15), 96 pages, XP051472612.

3GPP TS 38.211 V13.10.0 (Jun. 2018), 3rd Generation Partnership Project; Technical Specification Group Radio Access Network; Evolved Universal Terrestrial Radio Access (E-UTRA); Physical channels and modulation (Release 13), 173 pages, XP051472607.

Communication issued on May 23, 2025 from the European Patent Office for European Patent Application No. 23183810.3.

"Physical channels and modulation (3GPP TS 38.211 version 16.10.0 Release 16)", ETSI Technical Specification, Jul. 2022, 138 pages.

Communication issued on Dec. 12, 2023 by the European Patent Office for European Patent Application No. 23183810.3.

Office Action dated Nov. 13, 2025, issued by Indian Patent Office in Indian Application No. 202344045033.

Communication issued Jan. 29, 2026 by the European Patent Office for EP Patent Application No. 23183810.3.

* cited by examiner

METHOD AND ELECTRONIC DEVICE FOR TRANSMITTING PRECODED PUCCH SIGNAL IN WIRELESS COMMUNICATION SYSTEM

CROSS-REFERENCE TO RELATED APPLICATION

This application claims priority to Korean Patent Application No. 10-2022-0085878, filed on Jul. 12, 2022, in the Korean Intellectual Property Office, the disclosure of which is incorporated by reference herein in its entirety.

BACKGROUND

The present disclosure relates to a method and an electronic device for transmitting a signal, and in particular, to an electronic device for transmitting a physical uplink control channel (PUCCH) signal, which is precoded by using a plurality of antennas, and an operating method of the electronic device.

As mobile communication technology continues to develop, the use of portable terminals providing various functions continues to increase, and efforts have been made to develop a 5G communication system to meet the increasing demand for wireless data traffic. In addition to the frequency bands used in 3G communication systems and long term evolution (LTE) communication systems, implementations in higher frequency bands (for example, about 25 to about 60 GHz bands) are being considered to achieve higher data transmission speed in the 5G communication system.

For example, to reduce a path loss of a radio wave and to increase a propagation distance of a radio wave in a mmWave band, beamforming, massive multiple-input multiple-output (MIMO), full dimensional (FD) MIMO (FD-MIMO), an array antenna, analog beam-forming, and large scale antenna technology have been studied in the 5G communication system.

SUMMARY

The present disclosure provides an electronic device for transmitting a precoded physical uplink control channel (PUCCH) signal by using a plurality of antennas and an operating method of the electronic device.

According to example embodiments, there is provided an operation method of an electronic device including a plurality of antennas, the operation method including obtaining precoding information from a base station, generating a physical uplink control channel (PUCCH) precoding vector based on the precoding information, generating a precoded PUCCH signal by multiplying the PUCCH signal by a PUCCH precoding vector, and transmitting the precoded PUCCH signal to the base station by using the plurality of antennas.

According to example embodiments, there is provided an electronic device including a communication circuit including a plurality of antennas and configured to transmit a precoded physical uplink control channel (PUCCH) signal to a base station and receive precoding information, and a control circuit configured to generate a PUCCH precoding vector based on the precoding information, generate the precoded PUCCH signal by multiplying a PUCCH signal by the PUCCH precoding vector, and control the communication circuit to transmit the precoded PUCCH signal to the base station by using the plurality of antennas.

According to example embodiments, there is provided a wireless communication system including a base station configured to control an uplink based on a precoded physical uplink control channel (PUCCH) signal, and an electronic device including a plurality of antennas, a communication circuit configured to transmit the precoded PUCCH signal and receive a precoding information, and a control circuit configured to generate a PUCCH precoding vector based on the precoding information, generate the precoded PUCCH signal by multiplying a PUCCH signal by the PUCCH precoding vector, and control the communication circuit to transmit the precoded PUCCH signal to the base station by using the plurality of antennas.

BRIEF DESCRIPTION OF DRAWINGS

The above and other aspects and features will be more apparent from the following description of example embodiments, taken in conjunction with the accompanying drawings, in which.

DETAILED DESCRIPTION

Figure 1:
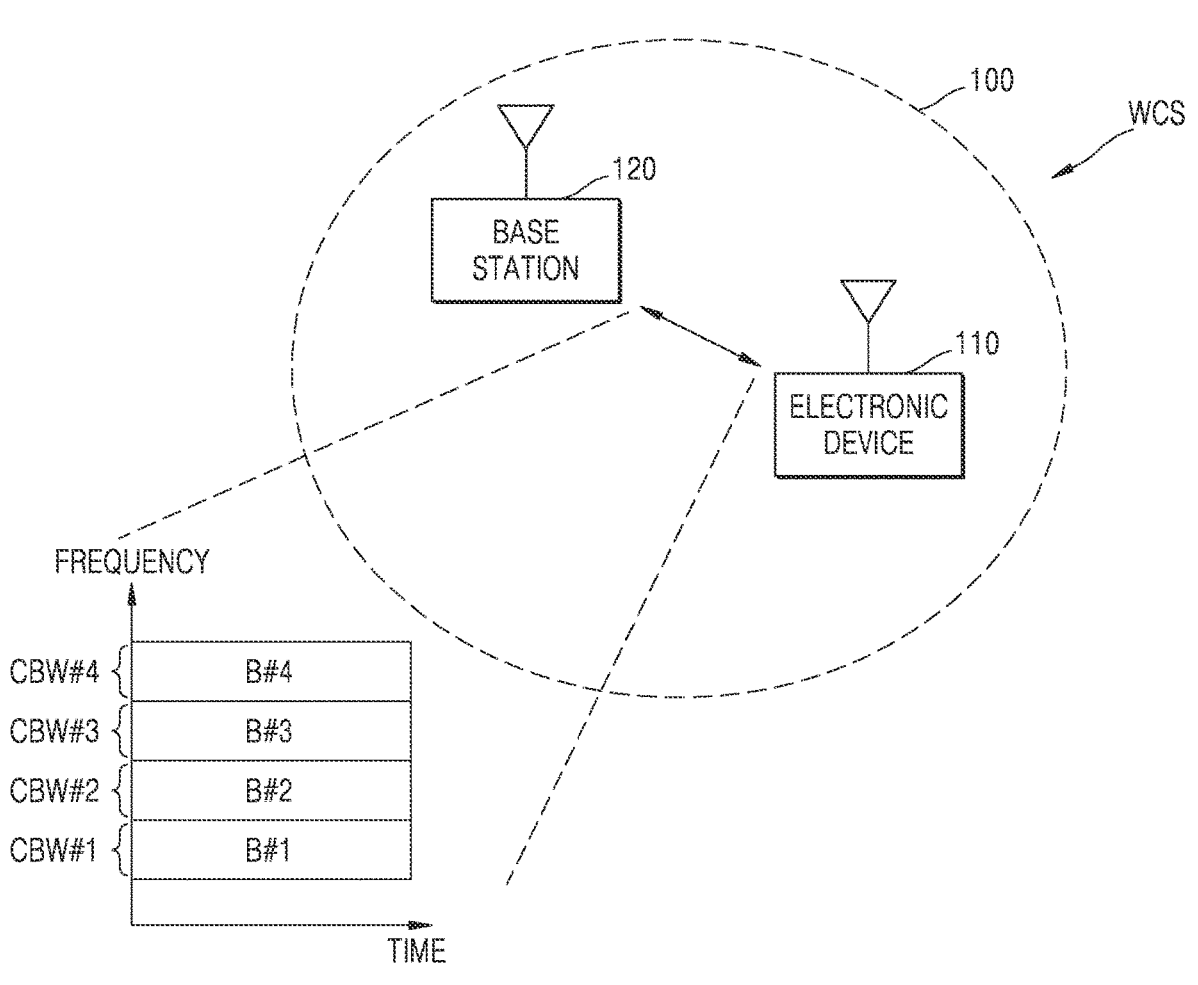
FIG. 1 is a block diagram of a wireless communication system according to an example embodiment.

Hereinafter, example embodiments will be described in detail with reference to the accompanying drawings. The same reference numerals may refer to the same elements throughout. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

A transmitting end may be referred to as a node providing a data service or a voice service. The node may be fixed or mobile. A receiving end may be referred to as a node receiving a data service or a voice service. The node may be fixed or mobile. For example, in the case of uplink, a terminal may include a transmitting end, and a base station may include a receiving end. In the case of downlink, the terminal may include a receiving end, and the base station may include a transmitting end.

FIG. 1 is a block diagram of a wireless communication system WCS according to an example embodiment.

Referring to FIG. 1, the wireless communication system WCS may include a base station 120 and an electronic device 110. The base station 120 may be generally referred to as a fixed station communicating with the electronic device 110 and/or another base station, and may exchange control information and data by communicating with the electronic device 110 and/or another cell. For example, the base station 120 may be referred to as a Node B, an evolved-Node B (eNB), a next generation node B (gNB), a sector, a site, a base transceiver system (BTS), an access point (AP), a relay node, a remote radio head (RRH), a radio unit (RU), a small cell, a wireless device, etc.

The electronic device 110 may be fixed or mobile, and may refer to various devices, which communicate with the base station 120 to transceive data and/or control information. For example, the electronic device 110 may be referred to as a terminal, terminal equipment, a mobile station (MS), a mobile terminal (MT), a user terminal (UT), a subscriber station (SS), a wireless communication device, a wireless device, a handheld device, etc.

The base station 120 may provide wireless broadband access to the electronic device 110 in a coverage 100 thereof. For example, the base station 120 may divide the entire band into first through fourth bands B #1 through B #4, and communicate with the electronic device 110 by using at least one of the first through fourth bands B #1 through B #4. The base station 120 may use a first component carrier for communication in the first band B #1, a second component carrier for communication in the second band B #2, a third component carrier for communication in the third band B #3, and a fourth component carrier for communication in the fourth band B #4. Each of the first through fourth bands B #1 through B #4 may have first through fourth carrier bandwidth CBW #1 through CBW #4, respectively, and the first through fourth carrier bandwidths CBW #1 through CBW #4 may be the same as, or partially or entirely different from each other. However, although an example embodiment using four bands B #1 through B #4 is illustrated in FIG. 1, example embodiments are not limited thereto, and example embodiments may use more or less bands. In the present disclosure, the base station 120 may manage bands as cells, and communication using a particular band may be understood as communication using a particular cell corresponding to the particular band. In this regard, the band may be referred to as the same concept as the cell.

The electronic device 110 may transmit a precoded physical uplink control channel (PUCCH) signal and a physical uplink shared channel (PUSCH) signal to the base station 120 by using any one of the first through fourth carrier bandwidths CBW #1 through CBW #4. The precoded PUCCH signal may be referred to as a signal used to transmit uplink control information (UCI). For example, the precoded PUCCH signal may be used by the electronic device 110 to send a hybrid automatic repeat and request (HARQ) acknowledgement to the base station 120, and to inform the base station 120 whether a downlink transmission block has been successfully received. In addition, the precoded PUCCH signal may be used to send a channel-state report to the base station 120, or to request resources to transmit uplink data.

The PUSCH signal may be used by the electronic device 110 to transmit user data to the base station 120. In addition, the PUSCH signal may be used to transmit a radio resource control (RRC) message and the UCI.

According to Technical Specification (TS) 38.211 of the 3rd Generation Partnership Project (3GPP), which prepares the 5G new radio (NR) standard, the PUCCH of NR should be transmitted to one antenna port (Antenna Port No. 2000), but a method of transmitting PUCCH by using a plurality of transmission antennas is not disclosed. In the present disclosure, the antenna port may have a logical concept, and may have a different meaning from an antenna, which is a physical concept. For example, one antenna port, which is a logical concept, may be physically provided by two or more antennas.

The present disclosure provides an operation method of transmitting the precoded PUCCH signal by an electronic device 110 including a plurality of antennas. According to the electronic device 110 and the operating method thereof according to an example embodiment, the reliability of precoded PUCCH signal transmission may be improved by transmitting the precoded PUCCH signal by using a plurality of antennas and the transmission diversity may be obtained.

Figure 2:
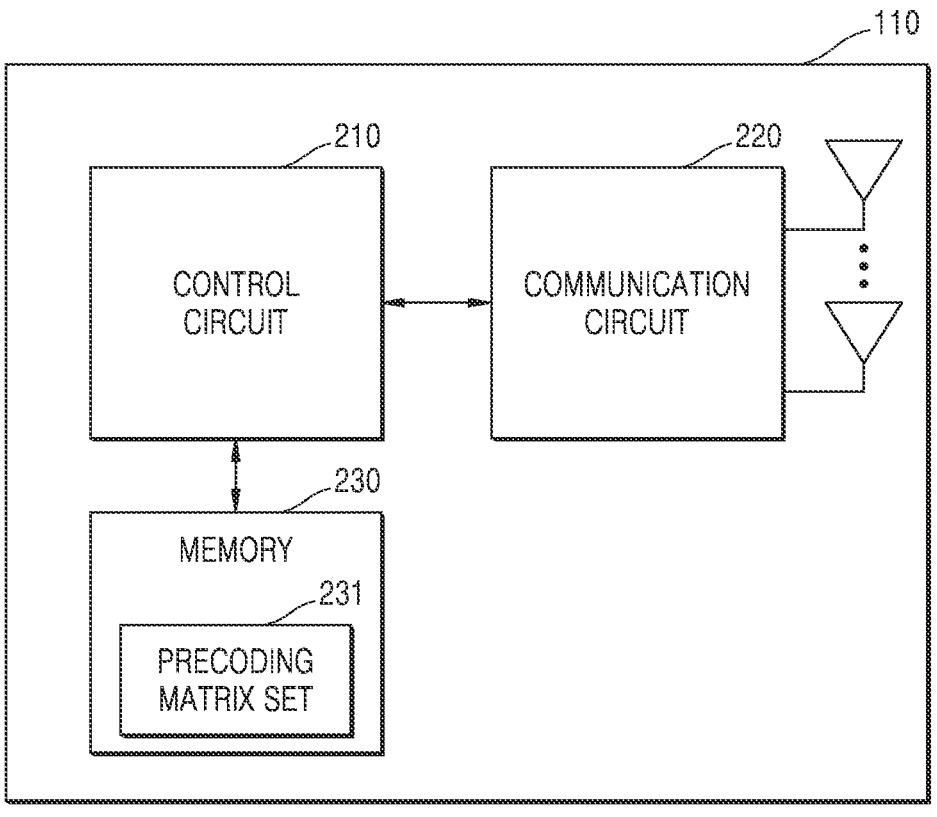
FIG. 2 is a block diagram of an electronic device according to an example embodiment.

FIG. 2 is a block diagram of the electronic device 110 according to an example embodiment.

The electronic device 110 may include a control circuit 210, a communication circuit 220, and a memory 230.

The communication circuit 220 may perform functions of transceiving signals via a wireless channel. In addition, the communication circuit 220 may include a plurality of antennas, may receive downlink signals by using a plurality of antennas under the control of the control circuit 210, and may transmit uplink signals by using a plurality of antennas under the control of the control circuit 210.

The communication circuit 220 may receive a downlink signal. The downlink signal may include precoding information, a reference signal (RS), system information, a configuration message, control information, downlink data, etc.

In the present disclosure, when the electronic device 110 is in a transmission mode based on a codebook, the precoding information may indicate information about the precoding matrix set 231 in the codebook. For example, the precoding information may include a transmission precoding matrix index (TPMI). The TPMI may correspond to an index of the precoding matrix set 231 in the codebook, and may indicate an index for selecting a PUSCH precoding matrix. Characteristics of channels transmitting PUSCH and PUCCH may be similar, and the TPMI may be used as an index for selecting the PUCCH precoding matrix.

When the electronic device 110 is in a transmission mode not based on the codebook, the precoding information may indicate information about a channel between the electronic device 110 and the base station 120 obtained by analyzing a channel state information-reference signal (CSI-RS) received from the base station 120.

In addition, the communication circuit 220 may transmit a uplink signal. The uplink signal may include a precoded PUCCH signal, a PUSCH signal, a random access-related signal, or a reference signal (for example, a sounding reference signal (RS) (SRS), demodulation (DM) RS (DM-RS), etc.

The memory 230 may store data, such as a basic program, an application program, and setting information for an operation of the electronic device 110. The memory 230 may include a volatile memory, a nonvolatile memory, or a combination thereof. When the electronic device 110 is in a transmission mode based on the codebook, the memory 230 may store the precoding matrix set 231 common to the base station 120. Also, when the control circuit 210 requests the precoding matrix set 231, the memory 230 may provide the precoding matrix set 231 stored in the memory 230 to the control circuit 210.

The control circuit 210 may control overall operations of the electronic device 110. For example, the control circuit 210 may transmit and receive a signal via the communication circuit 220. In addition, the control circuit 210 may record and read data in the memory 230. To this end, the control circuit 210 may include at least one processor or a microprocessor, or may include a portion of a processor.

The control circuit 210 may generate the PUCCH precoding vector based on the precoding information. In addition, the control circuit 210 may generate the precoded PUCCH signal by multiplying the PUCCH precoding vector by the PUCCH signal. The control circuit 210 may control the communication circuit 220 such that the communication circuit 220 transmits the precoded PUCCH signal to the base station 120 by using a plurality of antennas.

Figure 3:
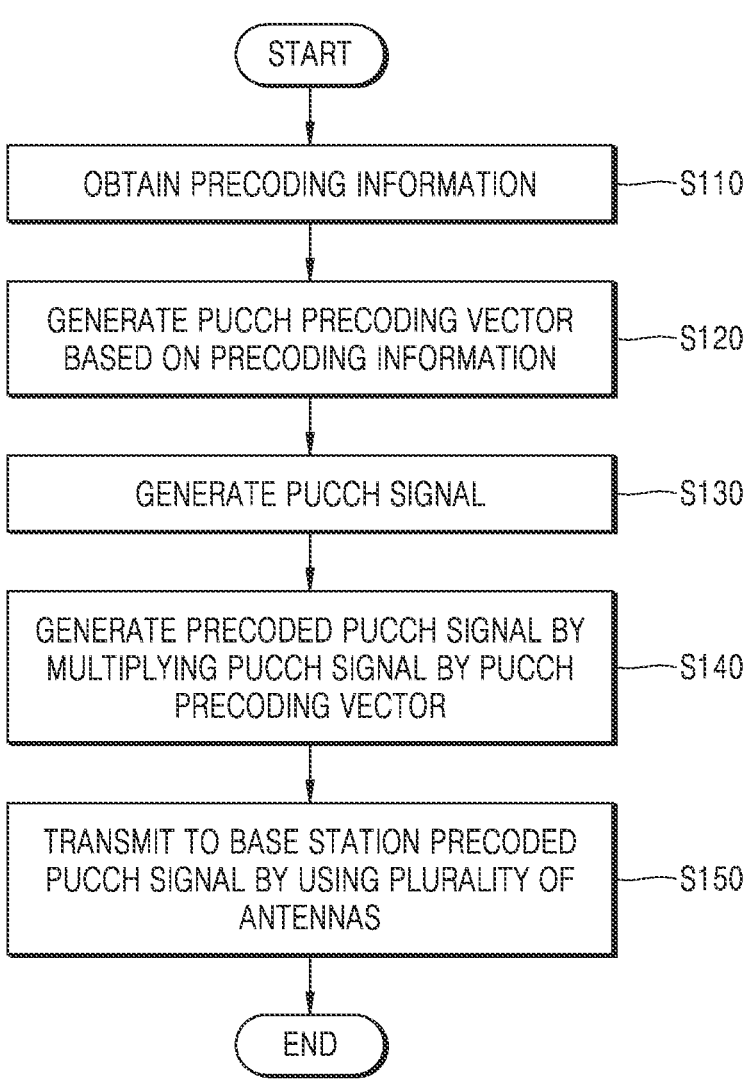
FIG. 3 is a flowchart of an operation of an electronic device according to an example embodiment.

FIG. 3 is a flowchart of an operation of the electronic device 110, according to an example embodiment.

FIG. 3 will be described with reference to FIG. 2. The operation method of the electronic device 110 including a plurality of antennas may include operations S110 through S150.

In operation S110, precoding information may be obtained. When the electronic device 110 is in a transmission mode based on the codebook, the precoding information may indicate information about the precoding matrix set 231 in the codebook. For example, the precoding information may include TPMI. On the other hand, when the electronic device 110 is in a transmission mode not based on the codebook, the precoding information may indicate information about a channel between the electronic device 110 and the base station 120 obtained by analyzing the CSI-RS received by the base station 120.

In operation S120, the PUCCH precoding vector may be generated based on the precoding information. The PUCCH precoding vector may be generated in a different manner according to a transmission mode of the electronic device 110. When the electronic device 110 is in a transmission mode based on the codebook, the PUCCH precoding vector may be selected from the precoding matrix set 231 common between the base station 120 and the electronic device 110. On the other hand, when the electronic device 110 is in a transmission mode not based on the codebook, the PUCCH precoding vector may be generated based on information about a channel between the electronic device 110 and the base station 120. That is, when the electronic device 110 is in a transmission mode not based on a codebook, the PUCCH precoding vector may be generated by calculating the PUCCH precoding vector suitable for a channel between the electronic device 110 and the base station 120.

In operation S130, the PUCCH signal may be generated. For example, the electronic device 110 may generate the PUCCH signal according to the NR standard. The PUCCH signal may be multiplied by the PUCCH precoding vector to be converted into the precoded PUCCH signal. In the present disclosure, the PUCCH signal may indicate a signal generated according to the 3GPP NR PUCCH standard, and the precoded PUCCH signal may indicate a signal, in which precoding is completed by multiplying the PUCCH signal by the PUCCH precoding vector.

In operation S140, the precoded PUCCH signal may be generated by multiplying the PUCCH signal by the PUCCH precoding vector. The electronic device 110 may generate the precoded PUCCH signal by multiplying the PUCCH signal generated in operation S130 by the PUCCH precoding vector generated in operation S120.

In operation S150, the precoded PUCCH signal may be transmitted to the base station 120 by using a plurality of antennas. The electronic device 110 may transmit the precoded PUCCH signal generated in operation S140 to the base station 120 by using a plurality of antennas, as discussed above with respect to the communication circuit 220 in FIG. 2.

Figure 4:
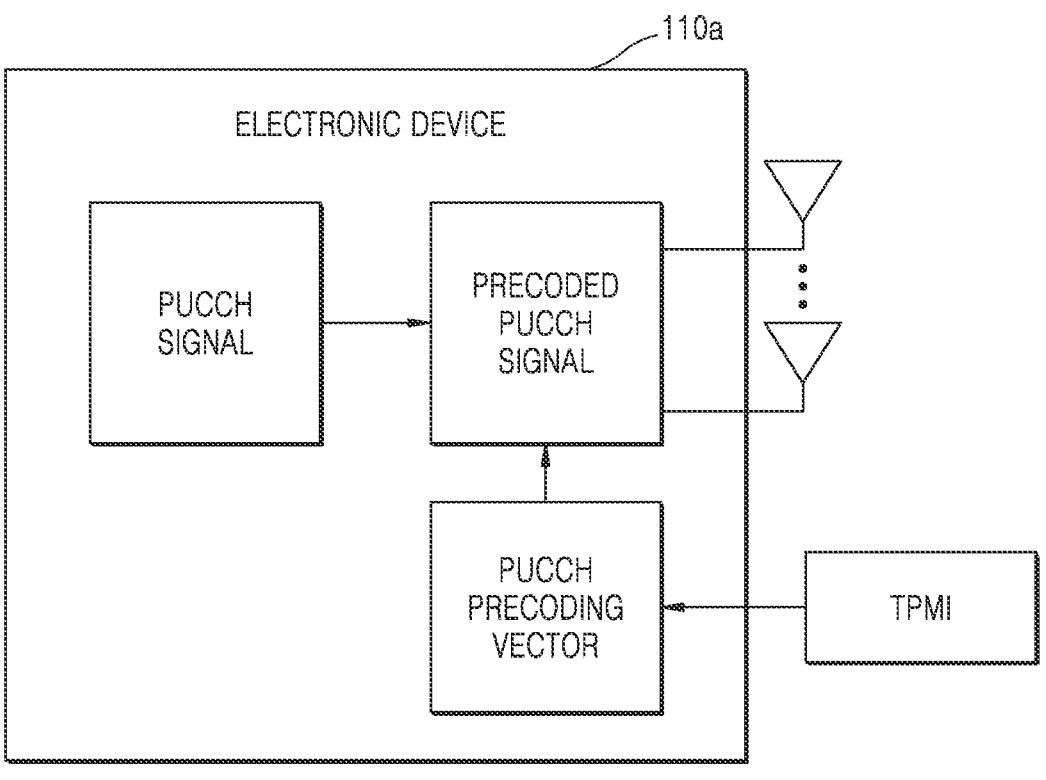
FIG. 4 is a block diagram of an operation of an electronic device in a transmission mode based on a codebook, according to an example embodiment.

FIG. 4 is a block diagram of an operation of an electronic device 110a in a transmission mode based on the codebook, according to an example embodiment. For example, the electronic device 110 may be the electronic device 110a when operating in the transmission mode based on the codebook.

When the electronic device 110a is in a transmission mode based on the codebook, the electronic device 110a and a base station may share the codebook including preset precoding matrices according to a transmission rank and the number of antennas. For example, the same codebook may be stored in both the electronic device 110a and the base station. Accordingly, the electronic device 110a and the base station may include a common precoding matrix set. The PUCCH precoding vector may be selected from a set of precoding matrices common between the electronic device 110a and the base station.

The electronic device 110a may receive information about the precoding matrix set from the base station. For example, the information about the precoding matrix set may include TPMI. The electronic device 110a may select the PUCCH precoding vector by receiving TPMI corresponding to an index of the precoding matrix set.

The electronic device 110a may generate the PUCCH signal to generate the precoded PUCCH signal. The PUCCH signal may indicate a signal multiplied to the PUCCH precoding vector for generating the precoded PUCCH signal. In some example embodiments, the PUCCH signal may be generated according to the NR standard.

The electronic device 110a may generate the precoded PUCCH signal by multiplying the PUCCH precoding vector selected from the precoding matrix set by the PUCCH signal. The electronic device 110a may multiply the PUCCH signal by the PUCCH precoding vector to transmit the precoded PUCCH signal by using a plurality of antennas.

The electronic device 110a may transmit the precoded PUCCH signal to the base station via a plurality of antennas. The precoded PUCCH signal may be logically transmitted to the base station via one antenna port by using the operation method described above, but may be physically transmitted to the base station via the plurality of antennas.

Figure 5:
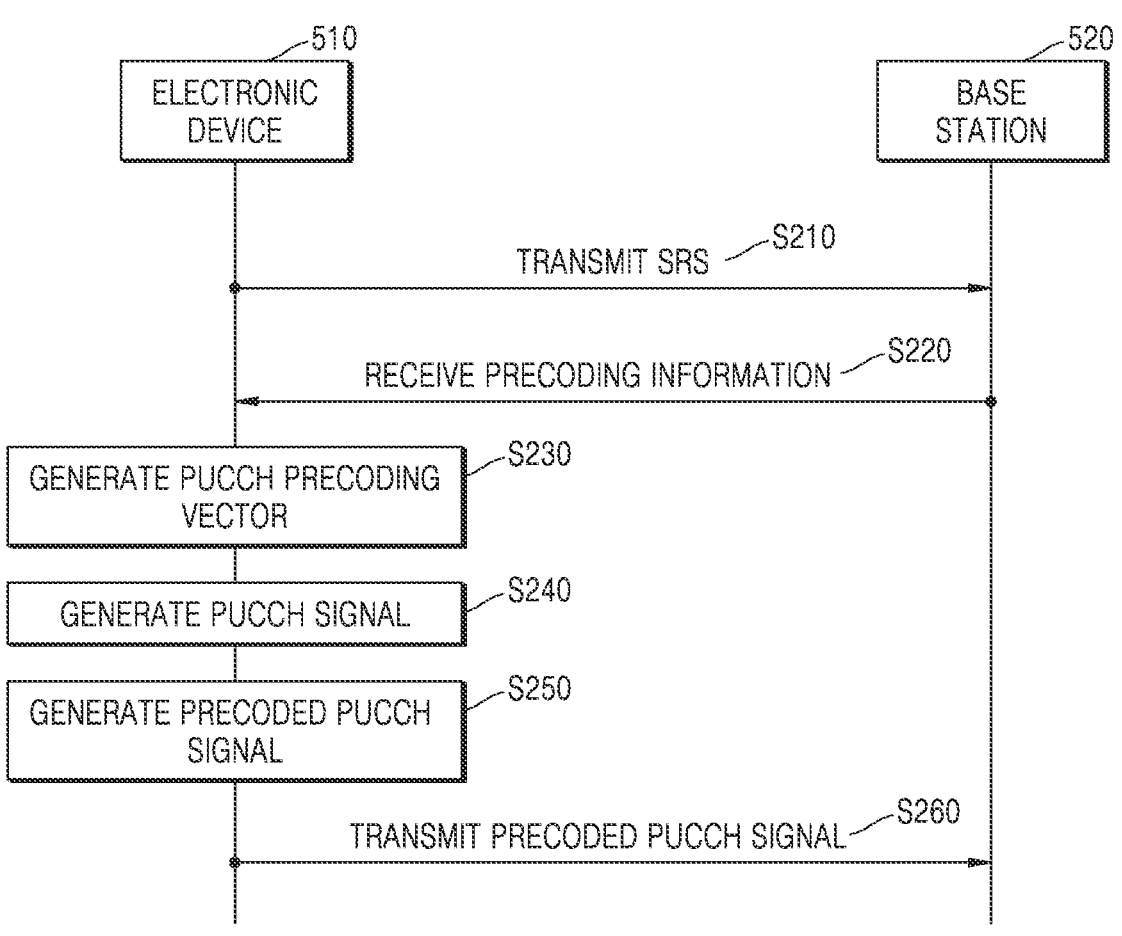
FIG. 5 is a signal exchange diagram in a transmission mode based on a codebook, according to an example embodiment.

FIG. 5 is a signal exchange diagram in a transmission mode based on the codebook, according to an example embodiment.

The signal exchange diagram of FIG. 5 will be explained with reference to signals transceived between an electronic device 510 and a base station 520. For example, the electronic device 110 may be the electronic device 510 and the base station 120 may be the base station 520.

In operation S210, the electronic device 510 may transmit the SRS to the base station 520. The SRS may indicate a signal transmitted from the electronic device 510 to the base station 520 to transmit information about the uplink.

In operation S220, the electronic device 510 may receive precoding information from the base station 520. The base station 520 may estimate uplink information based on the SRS received in operation S210. In addition, the base station 520 may estimate downlink information based on the channel reciprocity and the SRS. The base station 520 may transmit precoding information corresponding to the estimated uplink information to the electronic device 510. The precoding information may include an index of the precoding matrix set corresponding to uplink information estimated by the base station 520. For example, the precoding information may include TPMI.

In operation S230, the electronic device 510 may generate the PUCCH precoding vector. The electronic device 510 may select the precoding vector from the precoding matrix sets, based on the precoding information received in operation S220, and generate the selected precoding vector as the PUCCH precoding vector. Referring to FIG. 2, the electronic device 510 may generate a precoding vector corresponding to the precoding information from the precoding matrix sets 231 stored in the memory 230, as the PUCCH precoding vector.

In operation S240, the electronic device 510 may generate the PUCCH signal. For example, the PUCCH signal may be generated in a structure of PUCCH format 0 through PUCCH format 4 according to the 3GPP NR standard. The number of orthogonal frequency division multiplexing (OFDM) symbols of the PUCCH signal may vary according to the PUCCH format. For example, in the case of PUCCH format 0, the PUCCH signal may have one or two OFDM symbols.

In operation S250, The electronic device 510 may generate the precoded PUCCH signal. The electronic device 510 may generate the precoded PUCCH signal by multiplying the PUCCH signal generated in operation S240 by the PUCCH precoding vector generated in operation S230. The electronic device 510 may transmit the precoded PUCCH signal, generated by multiplying the PUCCH signal by the PUCCH precoding vector, by using a plurality of antennas.

In operation S260, the electronic device 510 may transmit the precoded PUCCH signal to the base station 520. The precoded PUCCH signal generated in operation S250 may be transmitted to the base station 520 via a plurality of antennas of the communication circuit 220 in FIG. 2. In some example embodiments, the PUCCH may be logically transmitted to one antenna port (e.g., Antenna Port No. 2000) according to TS 38.211 of the 3GPP. However, the PUCCH may be physically transmitted to the base station 520 via a plurality of antennas.

Figure 6:
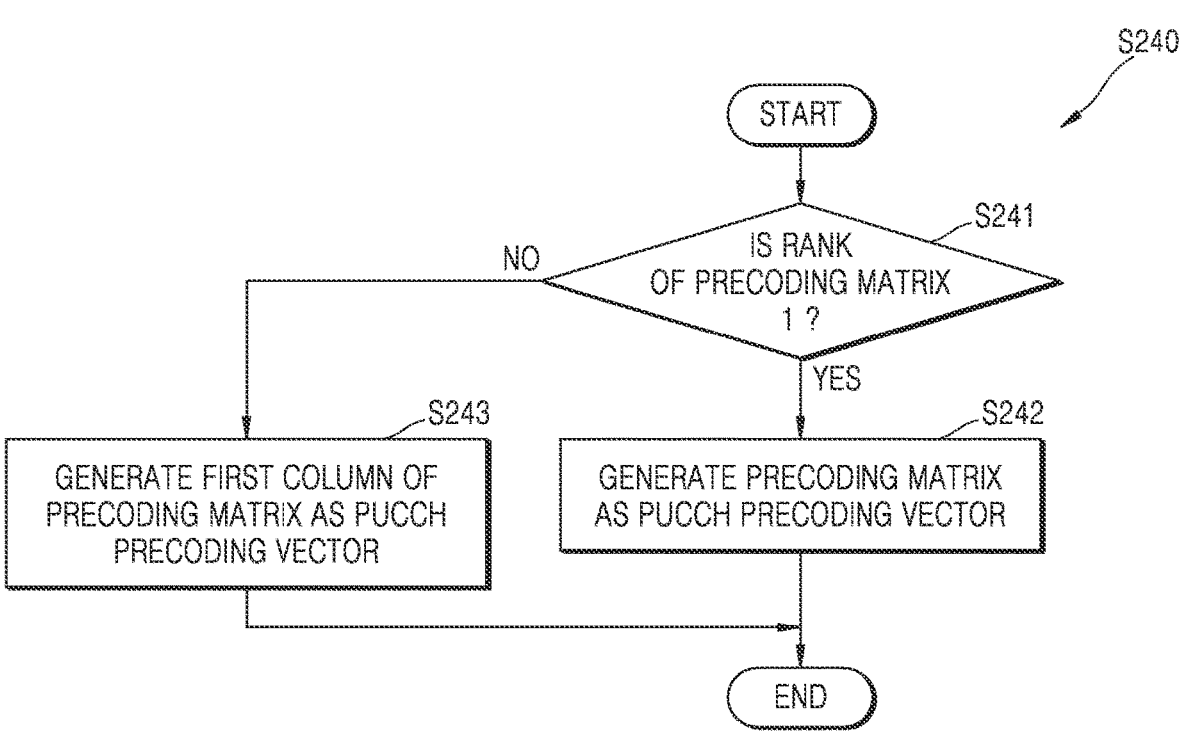
FIG. 6 is a flowchart of a physical uplink control channel (PUCCH) precoding vector generation operation, according to an example embodiment.

FIG. 6 is a flowchart of a PUCCH precoding vector generation operation, according to example embodiments. For example, the PUCCH precoding vector operation shown in FIG. 6 may correspond to the PUCCH precoding vector generation operation in FIG.

Referring to FIG. 6, the PUCCH precoding vector generation operation may include operations S241 through S243.

In operation S241, the electronic device 510 may determine whether the rank of the precoding matrix is 1, based on the precoding information received from the base station 520. The precoding matrix may indicate a matrix corresponding to the precoding information among the precoding matrices common between the electronic device 510 and the base station 520. According to the NR standard, the PUCCH may be required to be transmitted to one antenna port, and thus, the electronic device 510 may determine whether the rank of the precoding matrix is 1.

When the rank of the precoding matrix is 1, operation S242 may be performed. The electronic device 510 may generate the precoding matrix corresponding to the precoding information, as the PUCCH precoding vector.

When the rank of the precoding matrix is not 1, operation S243 may be performed. The electronic device 510 may generate a first column of the precoding matrix corresponding to the precoding information, as the PUCCH precoding vector. For example, when the rank of the precoding matrix is 2, the precoding matrix may include the first column and a second column. The electronic device 510 may generate the first column of the precoding vector as the PUCCH precoding vector. However, this is illustrated only as an example, and in some example embodiments, the electronic device 510 may generate the second column of the precoding vector as the PUCCH precoding vector.

Figure 7:
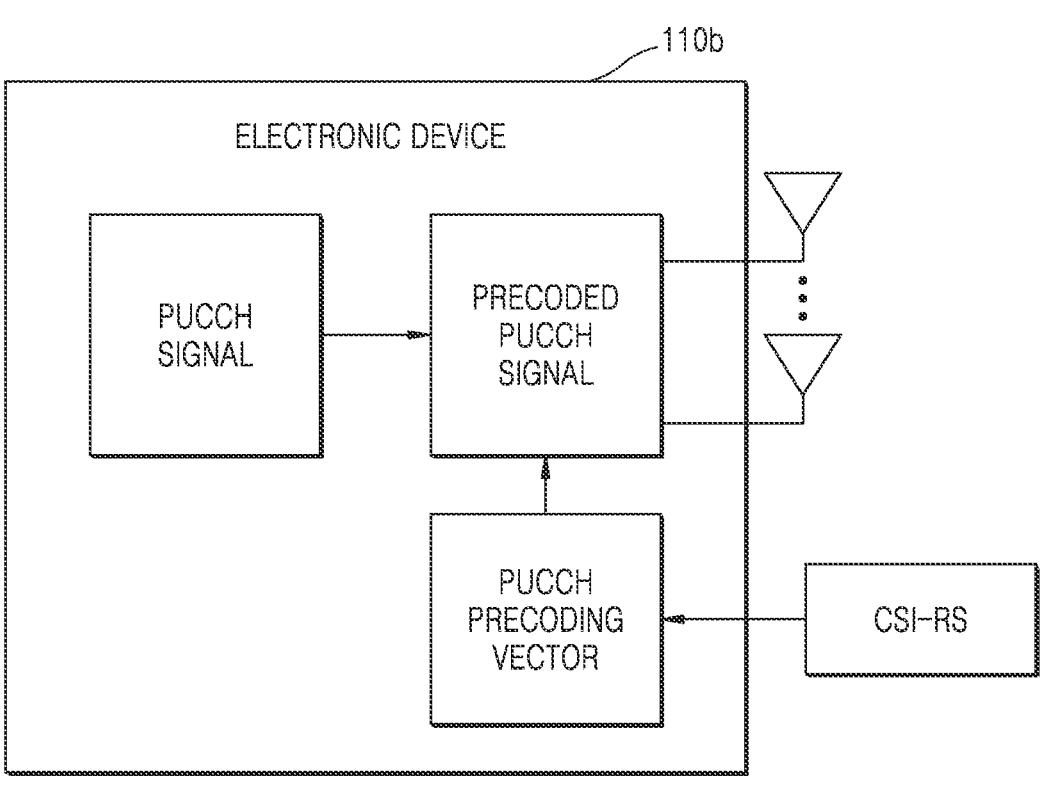
FIG. 7 is a block diagram of an operation of an electronic device in a transmission mode not based on a codebook, according to an example embodiment.

FIG. 7 is a block diagram of an operation of an electronic device 110b in a transmission mode not based on a codebook, according to an example embodiment. For example, the electronic device 110 may be the electronic device 110b when operating in the transmission mode not based on the codebook.

When the electronic device 110b is in a transmission mode not based on the codebook, the electronic device 110b and a base station may not share the codebook. The electronic device 110b may calculate a precoding vector suitable for the uplink instead of sharing the codebook with the base station.

The electronic device 110b may receive a reference signal to obtain downlink information from the base station. For example, the electronic device 110b may receive the CSI-RS from the base station. The electronic device 110b may estimate uplink information based on the received CSI-RS and the channel reciprocity. The electronic device 110b may calculate the precoding matrix suitable for the uplink based on the estimated uplink information, and may generate the calculated precoding matrix as the PUCCH precoding vector.

The electronic device 110b may generate the PUCCH signal to generate the precoded PUCCH signal. The PUCCH signal may indicate a signal multiplied to the PUCCH precoding vector for generating the precoded PUCCH signal. In some example embodiments, the PUCCH signal may be generated according to the NR standard.

The electronic device 110b may generate the precoded PUCCH signal by multiplying the PUCCH precoding vector selected from the precoding matrix set by the PUCCH signal. The electronic device 110b may transmit the precoded PUCCH signal, generated by multiplying the PUCCH signal by the PUCCH precoding vector, by using a plurality of antennas.

For example, a plurality of antennas may correspond to one antenna port. The precoded PUCCH signal may be logically transmitted to the base station via the one antenna port by using the operation method described above, and in this regard may be physically transmitted to the base station via the plurality of antennas.

Figure 8:
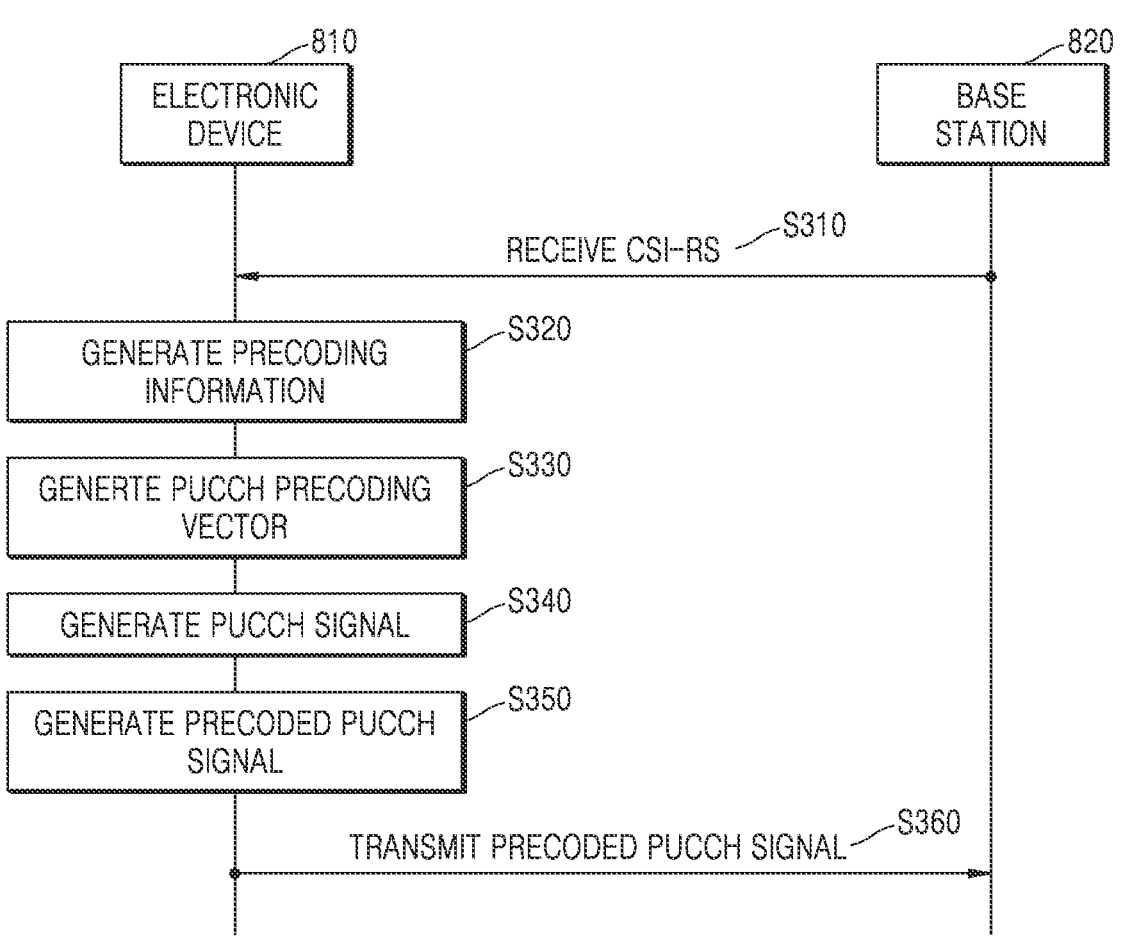
FIG. 8 is a signal exchange diagram in a transmission mode not based on a codebook, according to an example embodiment.

FIG. 8 is a signal exchange diagram in a transmission mode not based on the codebook, according to an example embodiment.

The signal exchange diagram of FIG. 8 will be explained with reference to signals transceived between an electronic device 810 and a base station 820. For example, the electronic device 110 may be the electronic device 810 and the base station 120 may be the base station 820.

In operation S310, the electronic device 810 may receive the CSI-RS from the base station 820. The CSI-RS may be referred to as a signal transmitted by the base station 820 to the electronic device 810, to transmit information about the downlink.

In operation S320, the electronic device 810 may generate the precoding information. In the transmission mode not based on the codebook, the precoding information may include information about a channel between the electronic device 810 and the base station 820. The electronic device 810 may obtain information about the downlink based on the CSI-RS received in operation S310. In addition, the electronic device 810 may obtain information about the uplink based on the CSI-RS and the channel reciprocity. Accordingly, in operation S320, the electronic device 810 may obtain information about a channel between the electronic device 810 and the base station 820, that is, information about the downlink and information about the uplink.

In operation S330, The electronic device 810 may generate the PUCCH precoding vector. The electronic device 810 may generate the PUCCH precoding vector suitable for the uplink based on the information about the uplink obtained in operation S320. An operation of generating the PUCCH precoding vector in a transmission mode not based on the codebook may be performed by using eigenvalue decomposition, which is described below with reference to FIG. 9. In addition, the operation of generating the PUCCH precoding vector may be performed by using singular value decomposition.

In operation S340, the electronic device 810 may generate the PUCCH signal. For example, the PUCCH signal may be generated in the structure of PUCCH format 0 through PUCCH format 4 according to the 3GPP NR standard. The number of OFDM symbols of the PUCCH signal may vary according to the PUCCH format. For example, in the case of PUCCH format 0, the PUCCH signal may have one or two OFDM symbols.

In operation S350, The electronic device 810 may generate the precoded PUCCH signal. The electronic device 810 may generate the precoded PUCCH signal by multiplying the PUCCH signal generated in operation S340 by the PUCCH precoding vector generated in operation S330.

In operation S360, The electronic device 810 may transmit the precoded PUCCH signal to the base station 820. The precoded PUCCH signal generated in operation S350 may be transmitted to the base station 820 via a plurality of antennas of the communication circuit 220 in FIG. 2. In some example embodiments, the PUCCH may be logically transmitted to one antenna port (e.g., Antenna Port No. 2000) according to TS 38.211 of the 3GPP. However, the PUCCH may be physically transmitted to the base station 820 via a plurality of antennas.

Figure 9:
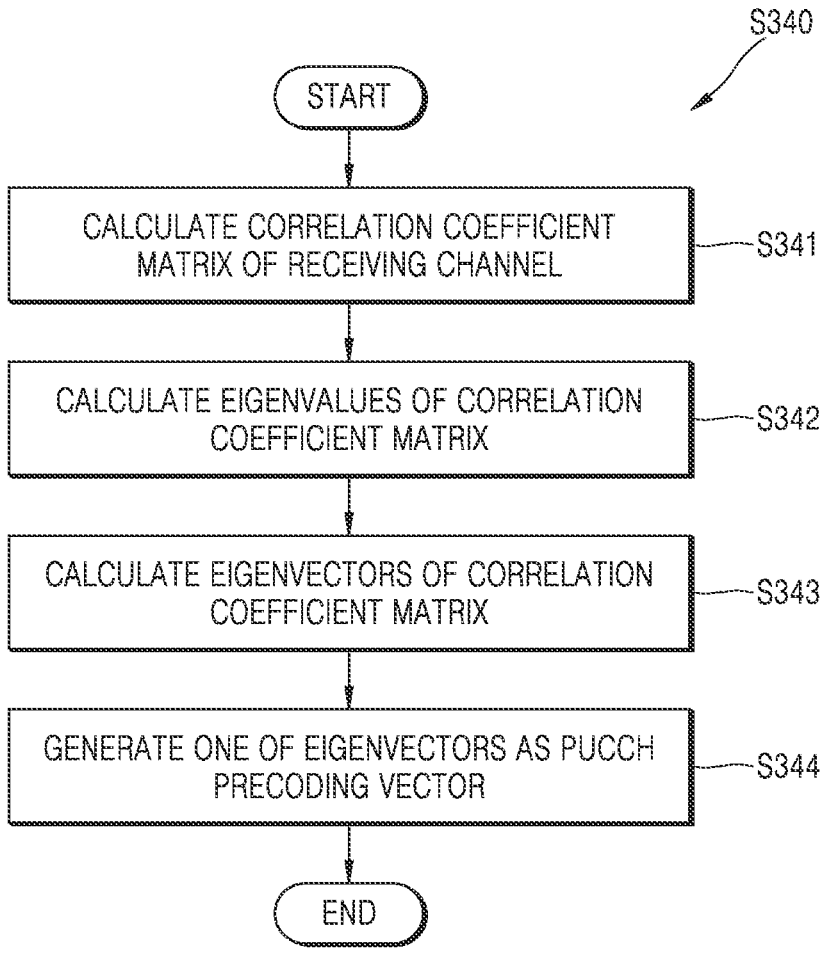
FIG. 9 is a flowchart of a PUCCH precoding vector generation operation, according to an example embodiment.

FIG. 9 is a flowchart of PUCCH precoding vector generation operation, according to example embodiments. For example, the PUCCH precoding vector operation shown in FIG. 9 may correspond to the PUCCH precoding vector generation operation in FIG. 8.

FIG. 9 will be described with reference to FIG. 8. Referring to FIG. 9, the PUCCH precoding vector generation operation may include operations S341 through S343.

In operation S341, the electronic device 810 may calculate a correlation coefficient matrix of the receiving channel. The electronic device 810 may calculate the correlation coefficient matrix of the downlink channel based on the information about the downlink obtained in operation S330 in FIG. 8. For example, when there are two antennas in the electronic device 810, the correlation coefficient matrix of the downlink channel may be represented by Formula 1 below.

$$H_{dl}H_{dl}^{H} = \begin{bmatrix} a & c^* \\ c & b \end{bmatrix} \qquad \text{[Formula 1]}$$

In this case, $H_{dl}$ may indicate a downlink channel matrix received from the base station 820, a and b may indicate positive real numbers, and c and c* may indicate complex numbers in a conjugated complex number relationship with each other.

In operation S342, the electronic device 810 may calculate the eigenvalues of a correlation coefficient matrix. The eigenvalues of the correlation coefficient matrix may be expressed by Formula 2 below.

$$\lambda_1 = \frac{a+b+\delta}{2}, \qquad \text{[Formula 2]}$$

$$\lambda_2 = \frac{a+b-\delta}{2},$$

$$\delta = \sqrt{(a-b)^2 + 4|c|^2}$$

In operation S343, the electronic device 810 may calculate the eigenvectors of the correlation coefficient matrix. The eigenvectors of the correlation coefficient matrix may be expressed by Formula 3 below.

$$\vec{v_1} = \begin{bmatrix} 1 \\ (\lambda_1 - a)/c^* \end{bmatrix}, \qquad \text{[Formula 3]}$$

$$\vec{v_2} = \begin{bmatrix} 1 \\ (\lambda_2 - a)/c^* \end{bmatrix}$$

In operation S344, the electronic device 810 may generate one of the eigenvectors as the PUCCH precoding vector. For example, the electronic device 810 may generate an eigenvector corresponding to the largest eigenvalue, as the PUCCH precoding vector, as described below with reference to FIG. 10.

Figure 10:
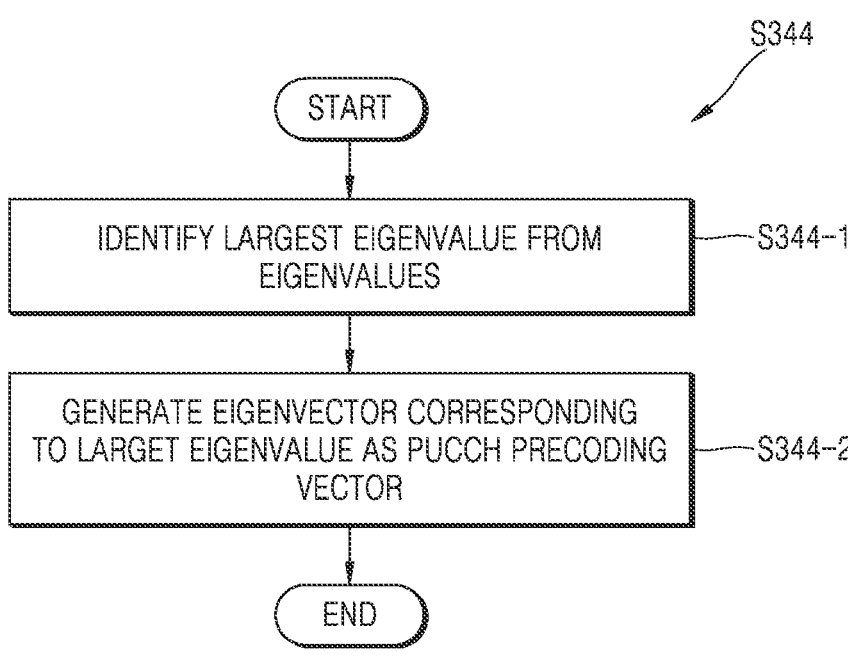
FIG. 10 is a detailed flowchart of an operation of generating one of eigenvectors, as a PUCCH precoding vector, according to an example embodiment.

FIG. 10 is a flowchart of an example of an operation of generating an eigenvector as the PUCCH precoding vector according to example embodiments. For example, the operation shown in FIG. 10 may correspond to the generating one of the eigenvectors in FIG. 9.

FIG. 10 will be described with reference to FIG. 9. Referring to FIG. 10, an operation of generating one of the eigenvectors as the PUCCH precoding vector may include operations S344-1 and S344-2.

In operation S344-1, the electronic device 810 may identify the largest eigenvalue from the eigenvalues generated in operation S342. For example, when $\lambda_1$ is greater than $\lambda_2$ among eigenvalues $\lambda_1$, $\lambda_2$ generated in operation S342, the electronic device 810 may identify that the largest eigenvalue is $\lambda_1$.

In operation S344-2, the electronic device 810 may generate an eigenvector corresponding to the largest eigenvalue, as the PUCCH precoding vector. For example, the electronic device 810 may generate $\vec{v_1}$ corresponding to the largest eigenvalue among $\vec{v_1}$, $\vec{v_2}$, that are eigenvectors generated in operation S343, as the PUCCH precoding vector.

Figure 11A:
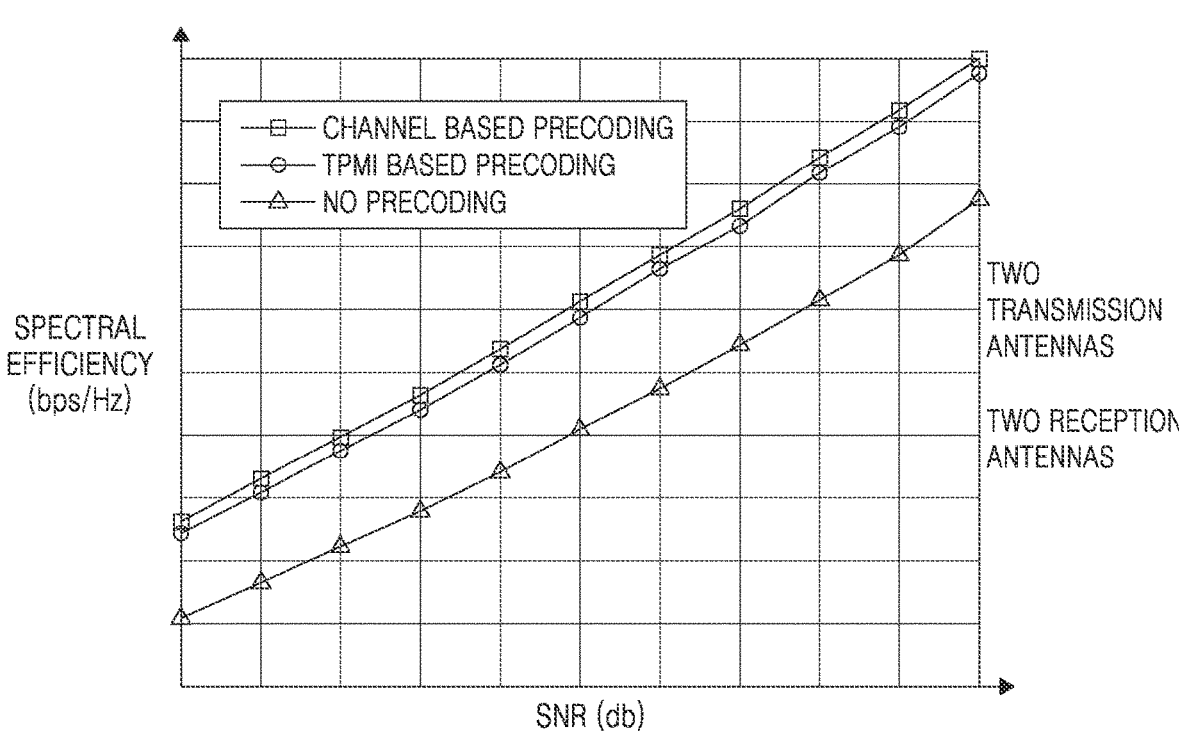
FIGS. 11A and 11B are diagrams of simulation results of an electronic device, according to example embodiments.
Figure 11B:
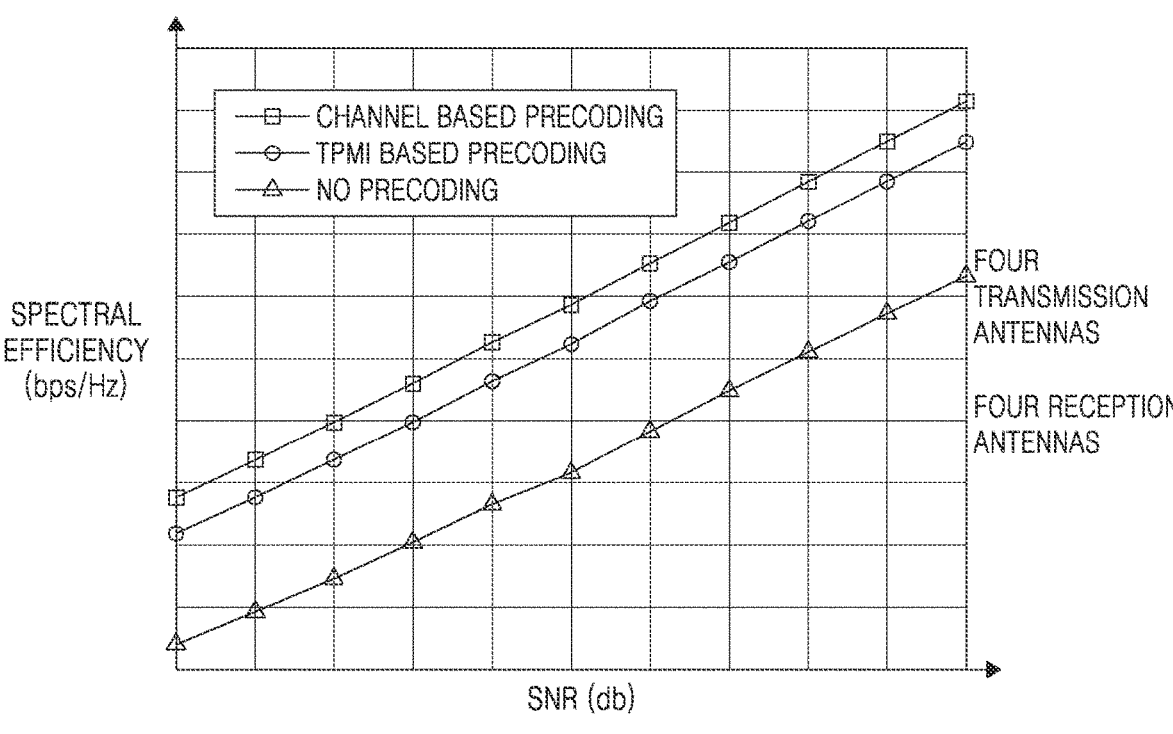

FIGS. 11A and 11B are diagrams of simulation results of the electronic device 110, according to example embodiments.

FIGS. 11A and 11B are described with reference to FIG. 1. As shown in FIGS. 11A and 11B, the electronic device 110 may completely estimate the downlink channel or the uplink channel, and the downlink may be the same as the uplink. FIG. 11A illustrates spectral efficiency according to a signal to noise ratio (SNR) when the number of transmitting antennas is two and the number of receiving antennas is two. FIG. 11A illustrates spectral efficiency according to the SNR when the number of transmitting antennas is four and the number of receiving antennas is four.

The SNR may indicate a ratio of a signal to a noise. When the SNR is low, it may indicate that the quality of a channel is low due to more noise in the channel between the electronic device 110 and the base station 120. Although the SNR is illustrated in FIGS. 11A and 11B, the simulation result will be described by using other metrics, such as a signal to interference plus noise ratio (SINR) and reference signals received power (RSRP), instead of the SNR.

The spectral efficiency may indicate the capacity of the channel. When the spectral efficiency is high, the channel state between the electronic device 110 and the base station 120 may be good, and it may indicate that the reliability of the precoded PUCCH signal transmitted by the electronic device 110 to the base station 120 is high.

Referring to FIG. 11A, it may be seen that when precoding is performed based on the TPMI, that is, when precoding is performed based on the codebook, the spectrum efficiency is higher than that when precoding is not performed throughout the entire SNR range.

In addition, it may be seen that even when precoding is performed based on the channel, that is, when precoding is performed not based on the codebook, the spectrum efficiency is higher than when precoding is not performed throughout the entire SNR range.

Thus, according to the precoded PUCCH signal transmission method, the reliability of the precoded PUCCH signal may be improved in both the case of precoding based on the codebook and the case of precoding not based on the codebook.

Referring to FIG. 11B, even when the number of transmitting antennas and the number of receiving antennas are both increased to 4, according to the precoded PUCCH signal transmission method, the spectral efficiency is higher than spectral efficiency when the precoding is not performed throughout the entire SNR range.

Figure 12:
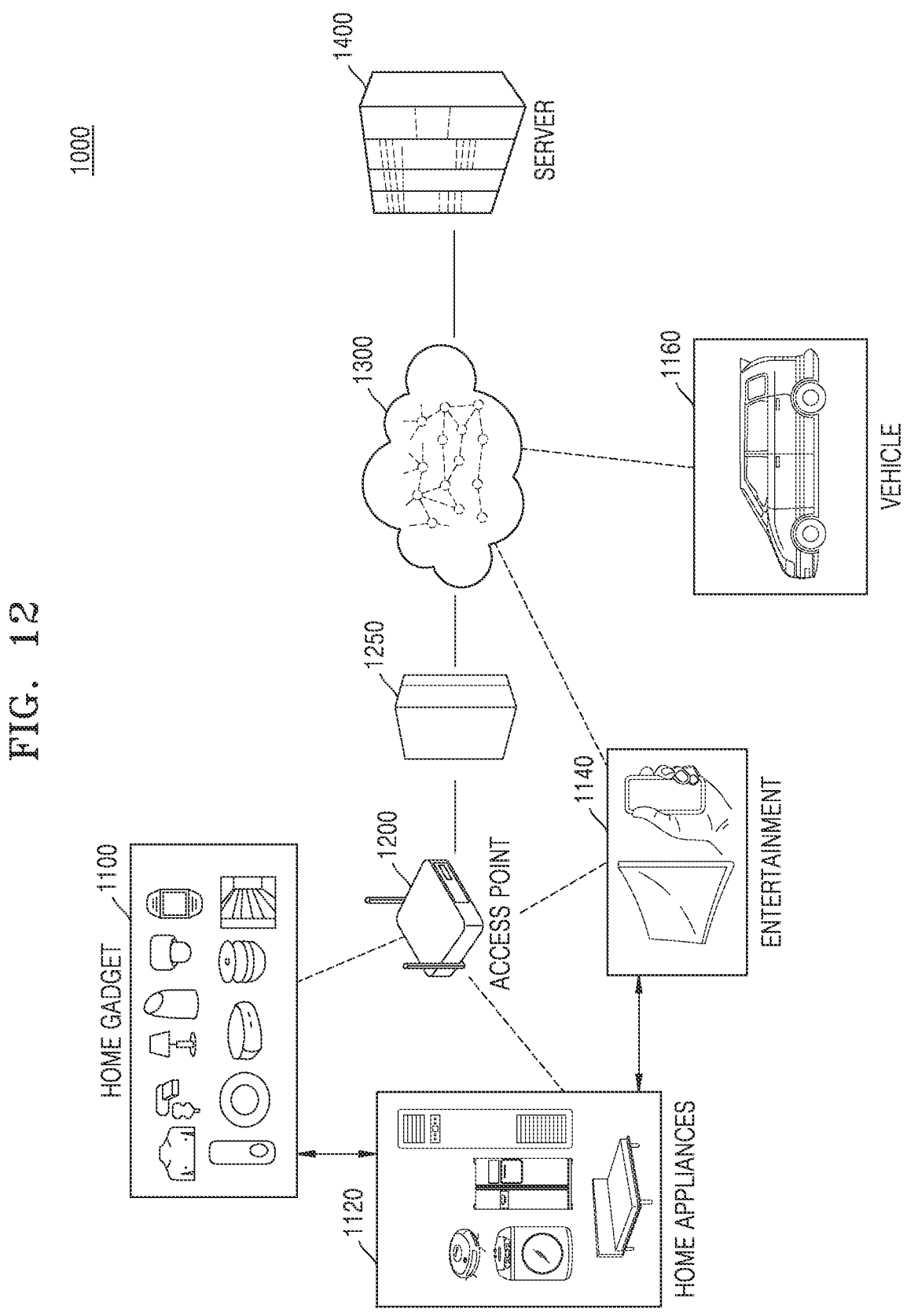
FIG. 12 is a conceptual diagram of an Internet of Things (IoT) network system according to an example embodiment.

FIG. 12 is a conceptual diagram of an Internet of Things (IoT) network system 1000 according to an example embodiment.

Referring to FIG. 12, the IoT network system 1000 may include a plurality of IoT devices 1100, 1120, 1140, and 1160, an access point 1200, a gateway 1250, a wireless network 1300, and a server 1400. The IoT may be referred to as a network of objects using wired/wireless communication.

The plurality of IoT devices 1100, 1120, 1140, and 1160 may be grouped according to characteristics of each IoT device. For example, the plurality of IoT devices 1100, 1120, 1140, and 1160 may be grouped into a home gadget group 1100, a home appliance/furniture group 1120, an entertainment group 1140, or a vehicle group 1160, etc. The plurality of IoT devices 1100, 1120, and 1140 may be connected to a communication network or other IoT devices via the access point 1200. The access point 1200 may be embedded in one IoT device. The gateway 1250 may change a protocol so that the access point 1200 is connected to an outside wireless network. The plurality of IoT devices 1100, 1120, and 1140 may be connected to an outside communication network via the gateway 1250. The wireless network 1300 may include an internet and/or a public network. The plurality of IoT devices 1100, 1120, 1140, and 1160 may be connected to a server 1400 providing a certain service via the wireless network 1300, and a user may use the service by using at least one of the plurality of IoT devices 1100, 1120, 1140, and 1160.

According to example embodiments, the plurality of IoT devices 1100, 1120, 1140, and 1160 may transmit the precoded PUCCH signal by using a plurality of antennas.

While aspects of example embodiments have been particularly shown and described, it will be understood that various changes in form and details may be made therein without departing from the spirit and scope of the following claims.

What is claimed is:

1. An operation method of an electronic device comprising a plurality of antennas, the operation method comprising:

obtaining precoding information from a base station;

generating a physical uplink control channel (PUCCH) precoding vector based on the precoding information;

generating a precoded PUCCH signal by multiplying a PUCCH signal by the PUCCH precoding vector; and transmitting the precoded PUCCH signal to the base station by using the plurality of antennas, wherein the generating the PUCCH precoding vector comprises:

obtaining the PUCCH precoding vector from a precoding matrix set, while a transmission mode of the electronic device is a first transmission mode that is based on a codebook; and obtaining the PUCCH precoding vector based on a channel state information-reference signal (CSI-RS) received from the base station, while the transmission mode of the electronic device is a second transmission mode that is not based on a codebook.

2. The operation method of claim 1, wherein the obtaining of the precoding information comprises transmitting a sounding reference signal (SRS) to the base station, and wherein the precoding information comprises information about the precoding matrix set.

3. The operation method of claim 2, wherein the information about the precoding matrix set comprises a transmission precoding matrix index (TPMI) corresponding to an index of the precoding matrix set.

4. The operation method of claim 3, wherein a precoding matrix of the precoding matrix set corresponds to the index, and wherein the generating of the PUCCH precoding vector comprises generating the precoding matrix as the PUCCH precoding vector based on a rank of the precoding matrix being 1.

5. The operation method of claim 3, wherein a precoding matrix of the precoding matrix set corresponds to the index, and wherein the generating of the PUCCH precoding vector comprises generating a first column of the precoding matrix as the PUCCH precoding vector based on a rank of the precoding matrix exceeding 1.

6. The operation method of claim 1, wherein the generating of the PUCCH precoding vector while the transmission mode of the electronic device is the second transmission mode comprises:

calculating a correlation coefficient matrix of a receiving channel;

calculating eigenvalues of the correlation coefficient matrix;

calculating eigenvectors of the correlation coefficient matrix; and generating one of the eigenvectors as the PUCCH precoding vector.

7. The operation method of claim 6, wherein the generating the one of the eigenvectors as the PUCCH precoding vector comprises:

identifying a largest eigenvalue from among the eigenvalues; and generating an eigenvector corresponding to the largest eigenvalue as the PUCCH precoding vector.

8. An electronic device comprising:

a communication circuit comprising a plurality of antennas and configured to transmit a precoded physical uplink control channel (PUCCH) signal to a base station and receive precoding information; and a control circuit configured to generate a PUCCH precoding vector based on the precoding information, generate the precoded PUCCH signal by multiplying a PUCCH signal by the PUCCH precoding vector, and control the communication circuit to transmit the precoded PUCCH signal to the base station by using the plurality of antennas, wherein the control circuit is further configured to:

obtain the PUCCH precoding vector from a precoding matrix set, while a transmission mode of the electronic device is a first transmission mode that is based on a codebook; and obtain the PUCCH precoding vector based on a channel state information-reference signal (CSI-RS) received from the base station, while the transmission mode of the electronic device is a second transmission mode that is not based on a codebook.

9. The electronic device of claim 8, further comprising a memory configured to store the precoding matrix set, wherein the control circuit is further configured to control the communication circuit to transmit a sounding reference signal (SRS) to the base station, and to receive the precoding information comprising information about the precoding matrix set from the base station.

10. The electronic device of claim 9, wherein the precoding information comprises a transmission precoding matrix index (TPMI) corresponding to an index of the precoding matrix set.

11. The electronic device of claim 10, wherein a precoding matrix of the precoding matrix set corresponds to the index, and wherein the control circuit is further configured to generate the precoding matrix as the PUCCH precoding vector based on a rank of the precoding matrix being 1.

12. The electronic device of claim 10, wherein a precoding matrix of the precoding matrix set corresponds to the index, and wherein the control circuit is further configured to generate a first column of the precoding matrix as the PUCCH precoding vector based on a rank of the precoding matrix exceeding 1.

13. The electronic device of claim 8, wherein the control circuit is further configured to, while the transmission mode of the electronic device is the second transmission mode, calculate a correlation coefficient matrix of a receiving channel, calculate eigenvalues of the correlation coefficient matrix, calculate eigenvectors of the correlation coefficient matrix, and generate one of the eigenvectors as the PUCCH precoding vector.

14. The electronic device of claim 13, wherein the control circuit is further configured to identify a largest eigenvalue from among the eigenvalues, and generate an eigenvector corresponding to the largest eigenvalue as the PUCCH precoding vector.

15. A wireless communication system comprising:

a base station configured to control an uplink based on a precoded physical uplink control channel (PUCCH) signal; and an electronic device comprising:

a plurality of antennas;

a communication circuit configured to transmit the precoded PUCCH signal and receive a precoding information; and a control circuit configured to generate a PUCCH precoding vector based on the precoding information, generate the precoded PUCCH signal by multiplying a PUCCH signal by the PUCCH precoding vector, and control the communication circuit to transmit the precoded PUCCH signal to the base station by using the plurality of antennas, wherein the control circuit is further configured to:

obtain the PUCCH precoding vector from a precoding matrix set, while a transmission mode of the electronic device is a first transmission mode that is based on a codebook; and obtain the PUCCH precoding vector based on a channel state information-reference signal (CSI-RS) received from the base station, while the transmission mode of the electronic device is a second transmission mode that is not based on a codebook.

16. The wireless communication system of claim 15, further comprising a memory configured to store the precoding matrix set which is common to the base station, wherein the control circuit is further configured to control the communication circuit to transmit a sounding reference signal (SRS) to the base station, and to receive the precoding information comprising information about the precoding matrix set from the base station.

17. The wireless communication system of claim 16, wherein the precoding information comprises a transmission precoding matrix index (TPMI) corresponding to an index of the precoding matrix set.

* * * * *